(12) United States Patent
Koga

(10) Patent No.: US 9,555,484 B2
(45) Date of Patent: Jan. 31, 2017

(54) DRILL AND METHOD OF PRODUCING MACHINED PRODUCT USING THE SAME

(71) Applicant: KYOCERA Corporation, Kyoto-shi, Kyoto (JP)

(72) Inventor: Kenichirou Koga, Dongguan (CN)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 14/655,794

(22) PCT Filed: Dec. 21, 2013

(86) PCT No.: PCT/JP2013/084384
§ 371 (c)(1),
(2) Date: Jun. 26, 2015

(87) PCT Pub. No.: WO2014/103972
PCT Pub. Date: Jul. 3, 2014

(65) Prior Publication Data
US 2015/0328693 A1 Nov. 19, 2015

(30) Foreign Application Priority Data
Dec. 28, 2012 (JP) .................................. 2012-286990

(51) Int. Cl.
*B23B 51/02* (2006.01)
(52) U.S. Cl.
CPC ............ *B23B 51/02* (2013.01); *B23B 2251/02* (2013.01); *Y10T 408/04* (2015.01); *Y10T 408/9097* (2015.01)
(58) Field of Classification Search
CPC .............................. B23B 51/02; B23B 2251/02
See application file for complete search history.

(56) References Cited

U.S. PATENT DOCUMENTS

| 2010/0021253 | A1 | 1/2010 | Frejd |
| 2010/0322723 | A1* | 12/2010 | Danielsson ............. B23B 51/02 407/114 |
| 2011/0318128 | A1 | 12/2011 | Schwagerl et al. |

FOREIGN PATENT DOCUMENTS

| CN | 102006959 A | 4/2011 |
| EP | 1358979 A2 | 11/2003 |

(Continued)

OTHER PUBLICATIONS

Chinese Office Action with English concise explanation, Chinese Patent Application No. 201380067796.6, Apr. 25, 2016, 11 pgs.

(Continued)

*Primary Examiner* — Sunil K Singh
*Assistant Examiner* — Alan Snyder
(74) *Attorney, Agent, or Firm* — Volpe and Koenig, P.C.

(57) ABSTRACT

A drill may have a cutting tip and a holder located on a rear end portion side of the cutting tip. The cutting tip has two cutting edges located away from each other at a front end portion, two flutes respectively extending from the first cutting edge and the second cutting edge toward the rear end portion, two side surfaces respectively extending from the first flute and the second flute toward a front side in a rotation direction, and two constraining surfaces respectively extending from the first side surface and the second side surface in a tilt direction with respect to the rotation direction. The first side surface and the second side surface are asymmetric with respect to a central axis, and the first constraining surface and the second constraining surface are point symmetric with respect to the central axis in a front end view.

15 Claims, 14 Drawing Sheets

(56) References Cited

FOREIGN PATENT DOCUMENTS

| | | |
|---|---|---|
| EP | 2266736 A1 | 12/2010 |
| JP | 2004-306170 A | 11/2004 |
| JP | 2011-005632 A | 1/2011 |
| JP | 2012-519602 A | 8/2012 |

OTHER PUBLICATIONS

International Search Report, PCT/JP2013/084384, Apr. 8, 2014 2 pgs.
Extended European Search Report, European Patent Application No. 13869362.7, Aug. 20, 2016, 8 pgs.

* cited by examiner

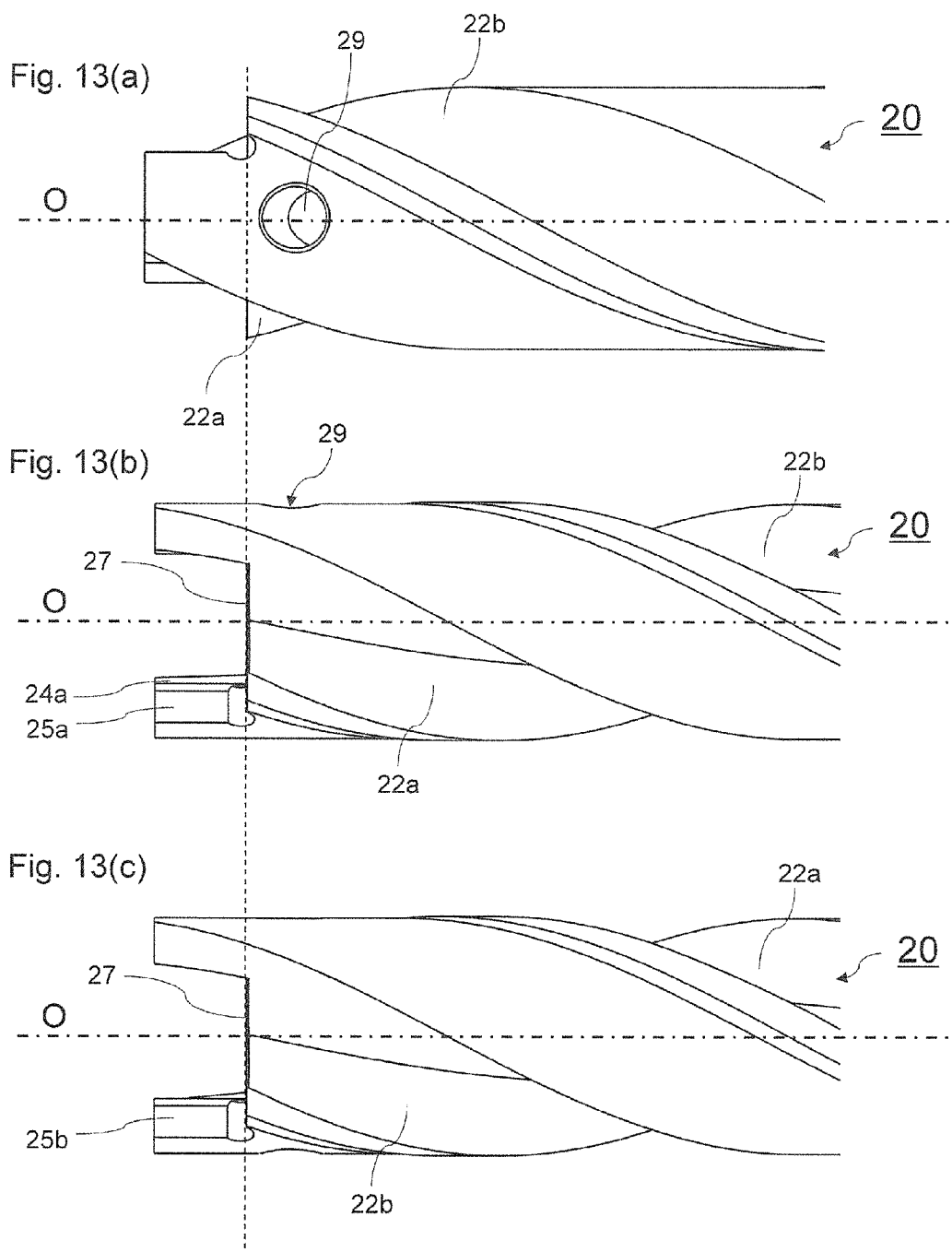

DRILL AND METHOD OF PRODUCING MACHINED PRODUCT USING THE SAME

TECHNICAL FIELD

The present invention relates to a drill and a method of producing a machined product using the drill.

BACKGROUND ART

Japanese Unexamined Patent Publication No. 2004-306170 discloses an indexable tool tip having a pair of torque receiving surfaces and a pair of clamp receiving surfaces. The torque receiving surfaces respectively intersect a rear end surface and a front end surface of a tip body and an outer peripheral surface of the tip body, and are oriented rearward in a rotation direction of a drill. The clamp receiving surfaces are respectively adjacent to the torque receiving surfaces. These clamp receiving surfaces and these torque receiving surfaces are respectively disposed in point symmetry with respect to an axis when viewed from the front end surface.

However, each of these surfaces is disposed point-symmetrically with respect to the axis in the indexable tool tip. When attaching the tip body to a drill body, it is difficult to determine an attachment direction by the pair of clamp receiving surfaces or the like, and there has been a risk that the tip body is attached to the drill body in a wrong direction.

Hence, there is a need for a drill having both excellent drilling performance and easy attachment performance, as well as a method of producing a machined product using the drill.

An object of the present invention is to provide the drill having both excellent drilling performance and easy attachment performance, and provide a method of producing a machined product using the drill.

SUMMARY OF THE INVENTION

A drill according to an embodiment of the present invention has a cutting tip and a holder. The cutting tip has a first cutting edge and a second cutting edge located away from each other at a front end portion of the cutting tip, a first flute and a second flute which are respectively continuous with the first cutting edge and the second cutting edge on a front side in a rotation direction, and extend toward a rear end portion side of the cutting tip, a first side surface and a second side surface which are respectively continuous with the first flute and the second flute on the front side in the rotation direction, and extend toward the front side in the rotation direction, a first constraining surface and a second constraining surface which are respectively continuous with the first side surface and the second side surface on the front side in the rotation direction, and extend in a tilt direction with respect to the rotation direction, and a bottom surface located on the rear end portion. The holder is located on the rear end portion side of the cutting tip. The holder has a mounting surface being in contact with the bottom surface, a first contact surface and a second contact surface being respectively in contact with the first side surface and the second side surface, and a first hold surface and a second hold surface being respectively in contact with the first constraining surface and the second constraining surface. The first side surface and the second side surface are asymmetric with respect to a central axis, and the first constraining surface and the second constraining surface are point symmetric with respect to the central axis in a front end view.

BRIEF DESCRIPTION OF THE DRAWINGS

FIG. 13(a) is a side view of the holder shown in FIG. 12, which is viewed from an arrowed direction A, FIG. 13(b) is a side view of the holder viewed from an arrowed direction B, and FIG. 13(c) is a side view of the holder viewed from an arrowed direction C.

EMBODIMENTS FOR CARRYING OUT THE INVENTION

<Drill>

An embodiment of a drill according to the present invention is described in detail below with reference to FIGS. 1 to 6 and FIGS. 11 to 13.

Figure 1A:
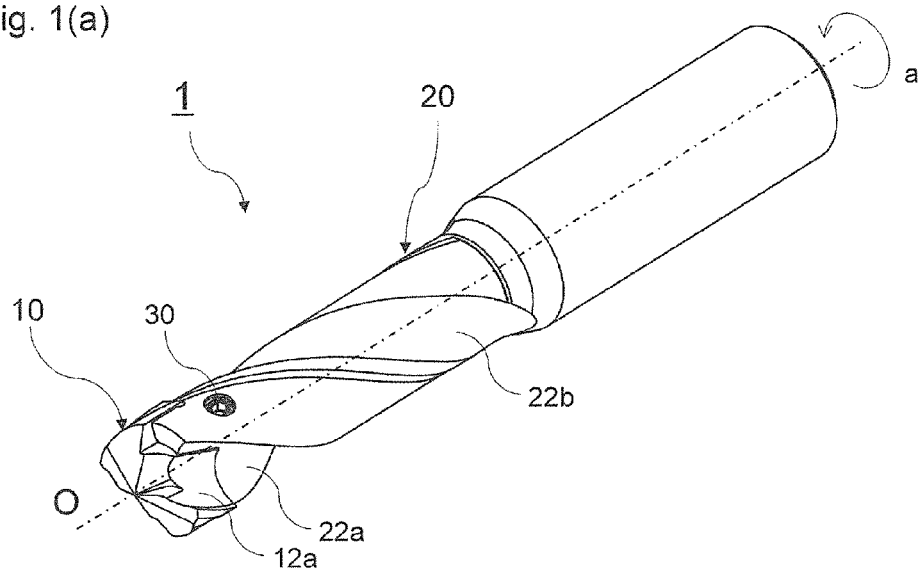
FIG. 1(a) is a perspective view of a drill according to an embodiment of the present invention.
Figure 1B:
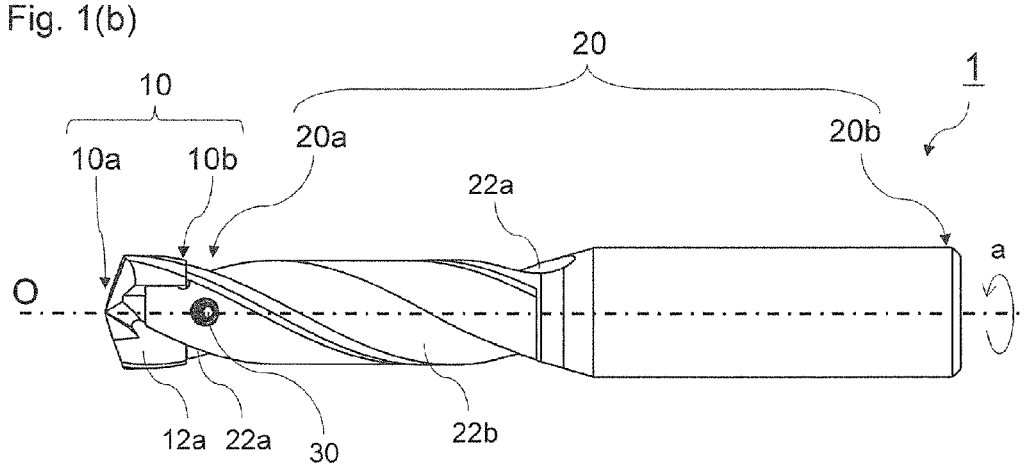
FIG. 1(b) is a side view thereof.
Figure 2:
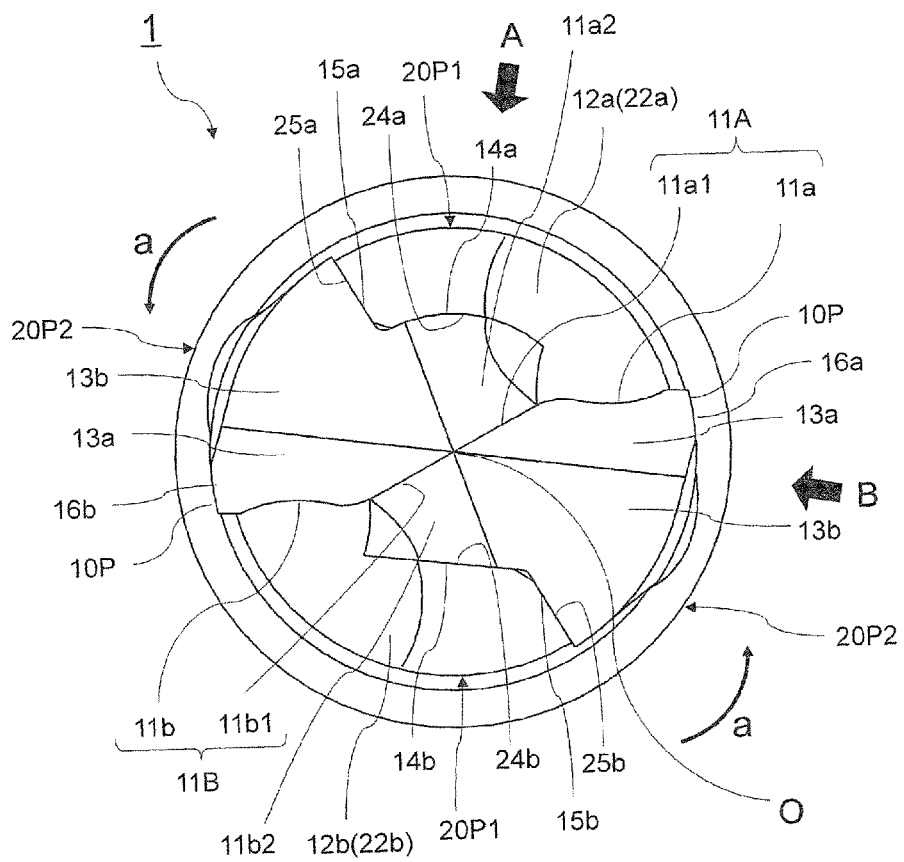
FIG. 2 is a front end view when the drill shown in FIG. 1 is viewed from a front end thereof.

As shown in FIG. 1, the drill 1 of the present embodiment generally has a holder 20 to be held by a rotative spindle or the like of a machine tool, and a cutting tip 10 attached to a front end portion 20a of the holder 20. The holder 20 is to be designed according to the shape of a rotary shaft of the machine tool (not shown). The cutting tip 10 is a major part to be brought into contact with a workpiece so as to perform cutting. The drill 1 of the present embodiment is a double-edged drill having two cutting edges 11A and 11B as shown in FIG. 2. Arrow "a" indicated in FIG. 1 and the like is a rotation direction of the drill 1.

(Cutting Tip)

The cutting tip 10 has a major role in cutting the workpiece.

Figure 5A:
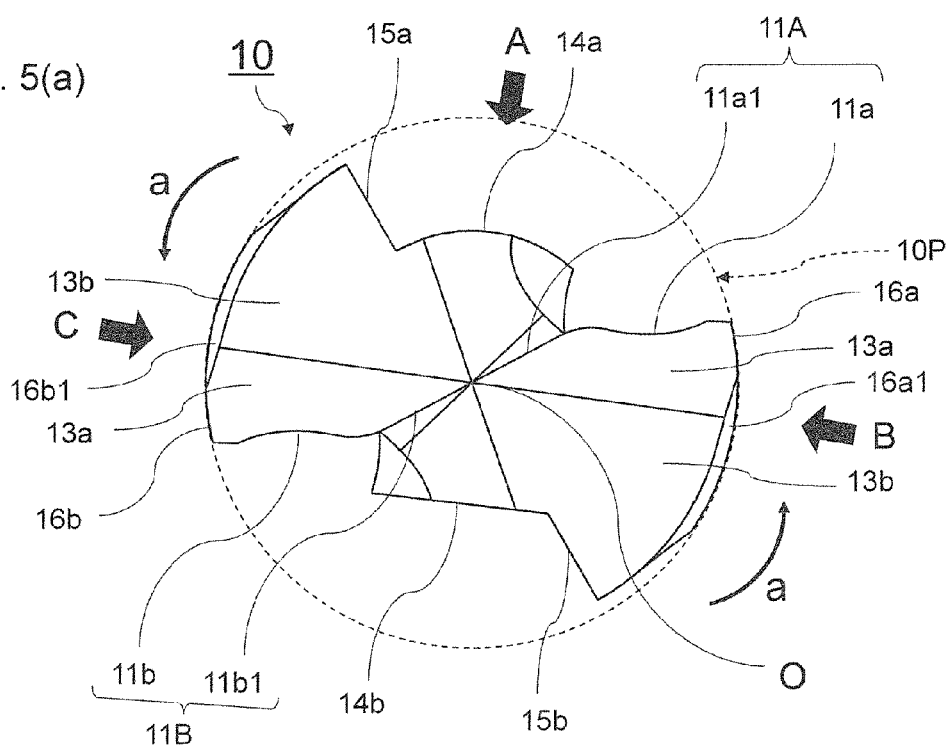
FIG. 5(a) is a front end view when the cutting tip shown in FIG. 4 is viewed from a front end thereof.

The cutting tip 10 of the present embodiment is of indexable type that is attachable to and detachable from the holder 20 as described later. As shown in FIG. 5, the cutting tip 10 has a first cutting edge 11a and a second cutting edge 11b, a first flute 12a and a second flute 12b, a first side surface 14a and a second side surface 14b, a first constraining surface 15a and a second constraining surface 15b, and a bottom surface 17.

The first cutting edge 11a and the second cutting edge 11b are located away from each other at a front end portion as shown in FIG. 2. The first flute 12a and the second flute 12b are respectively continuous with the first cutting edge 11a and the second cutting edge 11b on a front side in the rotation direction as shown in FIG. 5. The first flute 12a and the second flute 12b extend toward a rear end portion side.

Figure 6A:
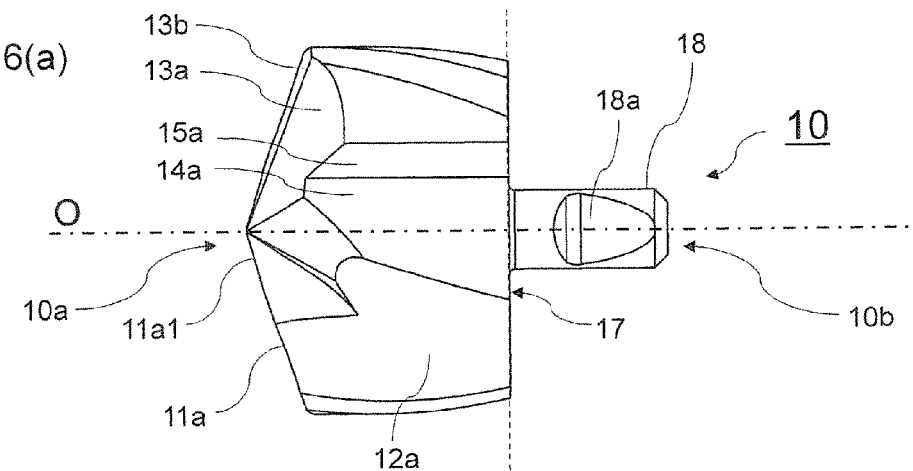
FIG. 6(a) is a side view of the cutting tip in FIG. 5(a), which is viewed from an arrowed direction A.
Figure 6B:
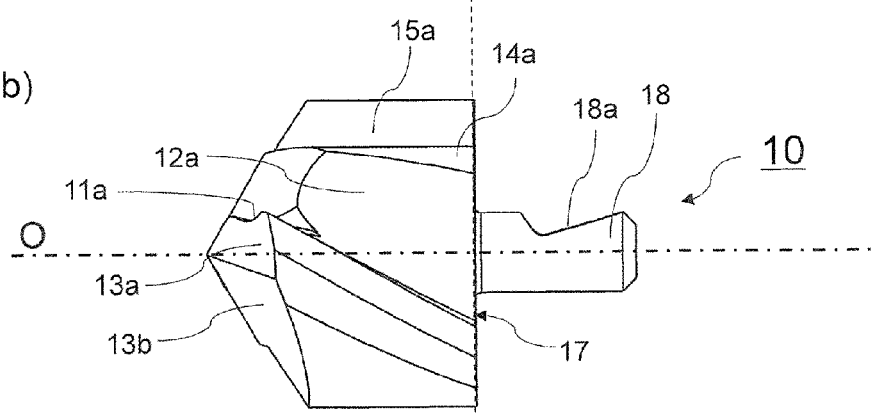
FIG. 6(b) is a side view of the cutting tip, which is viewed from an arrowed direction B.
Figure 6C:
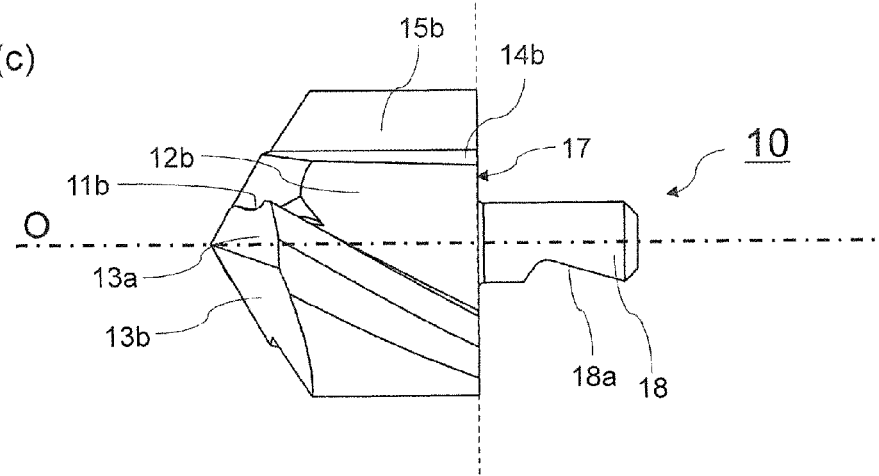
FIG. 6(c) is a side view of the cutting tip, which is viewed from an arrowed direction C.

The first side surface 14a and the second side surface 14b are respectively continuous with the first flute 12a and the second flute 12b on the front side in the rotation direction as shown in FIG. 2. The first side surface 14a and the second side surface 14b extend toward the front side in the rotation direction. The first constraining surface 15a and the second constraining surface 15b are respectively continuous with the first side surface 14a and the second side surface 14b on the front side in the rotation direction. The first constraining surface 15a and the second constraining surface 15b extend in a tilt direction with respect to the rotation direction. The bottom surface 17 is located closer to a rear end portion 10b as shown in FIG. 6. Components are described in sequence below.

These two cutting edges (first cutting edge 11a and second cutting edge 11b) are major portions for cutting the workpiece and are formed at a front end portion 10a of the cutting tip 10. In the present embodiment, the first cutting edge 11a and the second cutting edge 11b are located to have 180 degree rotational symmetry with respect to a central axis O (axis) of the cutting tip 10 as shown in FIG. 5.

That is, the first cutting edge 11a and the second cutting edge 11b have dyad symmetry with respect to the central axis O. In other words, the first cutting edge 11a and the second cutting edge 11b are point symmetric with respect to the central axis O when the cutting tip 10 is viewed from the front end portion 10a. The arrangement of the first cutting edge 11a and the second cutting edge 11b ensures improvement of straight advance stability during machining of the workpiece.

Here, the central axis O of the cutting tip 10 is the axis extending between the front end portion 10a and the rear end portion 10b, and denotes the axis serving as a rotation axis when the cutting tip 10 is rotated in a state in which the cutting tip 10 is viewed from the front end portion 10a. In the present embodiment, the central axis O of the cutting tip 10 lies at the same position as the rotation axis of the holder and the drill which is described later. Hence, the rotation axis of the holder and the drill described later is described as the rotation axis O by using the same reference character as the central axis O of the cutting tip 10.

Figure 4:
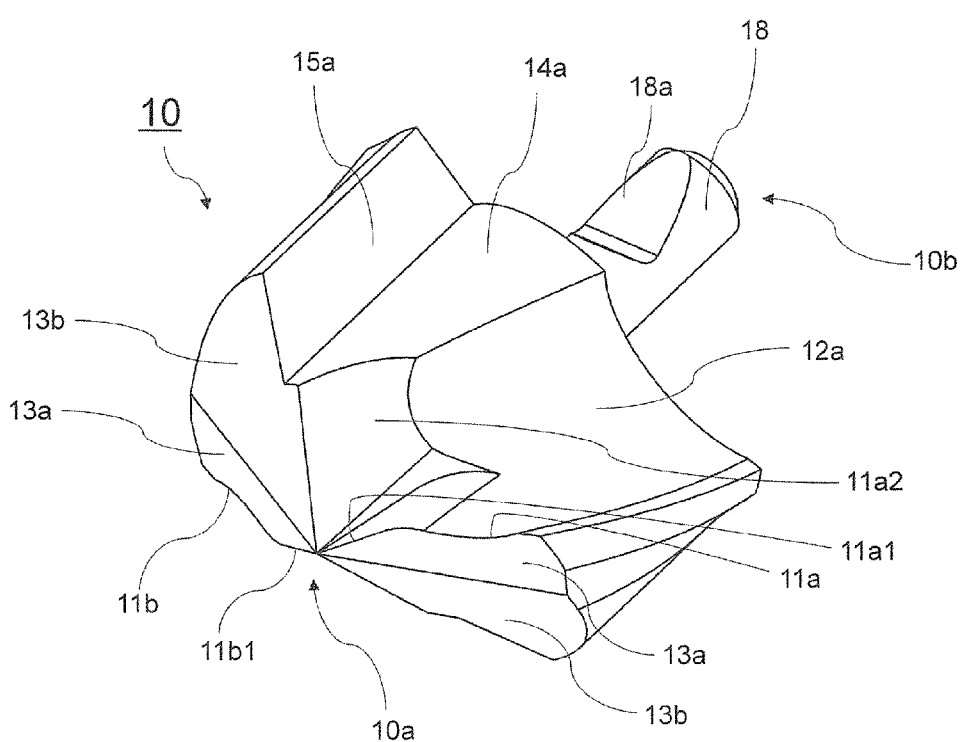
FIG. 4 is a perspective view showing a cutting tip of the drill in FIG. 1.

In the present embodiment, chisel edges (first chisel edge 11a1 and second chisel edge 11b1) are located closest to the front end portion 10a of the cutting tip 10 as shown in FIG. 4. The chisel edges 11a1 and 11b1 have a role in cutting the workpiece together with the first cutting edge 11a and the second cutting edge 11b.

In the present embodiment, as shown in FIG. 2 and the like, thinning surfaces 11a2 and 11b2 are disposed so as to be continuous with a second flank surface 13b on a side opposite to that on a first flank surface 13a. These thinning surfaces 11a2 and 11b2 may be cut flat so as to be further tilted toward the rear end portion 10b as departing from the second flank surface 13b. This makes it possible to reduce cutting resistance applied to the chisel edges 11a1 and 11b1 during a cutting process.

Figure 5B:
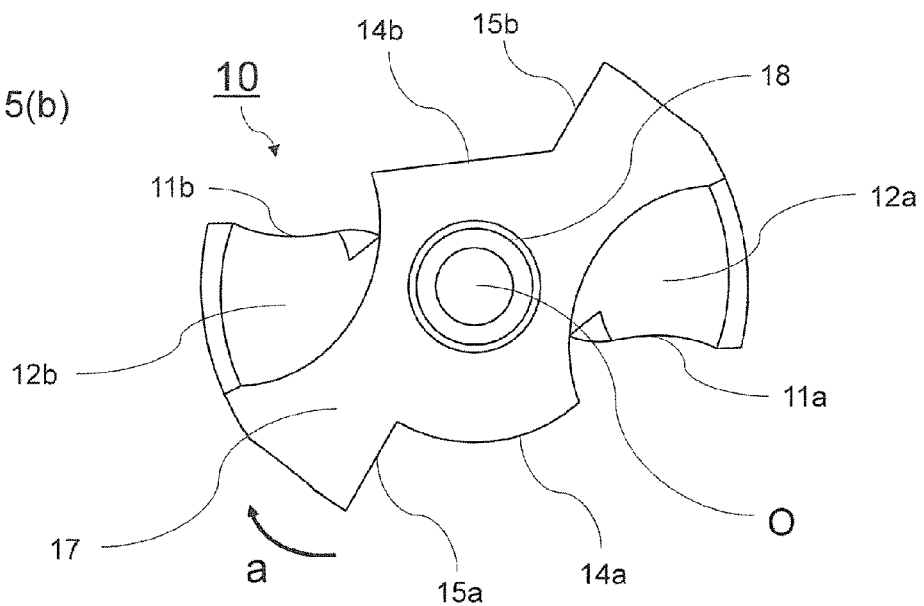
FIG. 5(b) is a rear end view when the cutting tip is viewed from a rear end thereof.

Two flutes (first flute 12a and second flute 12b) have a primary purpose of discharging chips generated by two cutting edges 11A and 11B to the outside. Specifically, the first flute 12a and the second flute 12b are respectively continuous with the first cutting edge 11a and the second cutting edge 11b as shown in FIG. 5(b). The first flute 12a and the second flute 12b extend spirally from the front end portion to the rear end portion of the cutting tip 10 (toward the holder 20). In the present embodiment, a flute width of the first flute 12a and a flute width of the second flute 12b are identical, and a depth of the first flute 12a and a depth of the second flute 12b are constant.

During the cutting process, chips generated by the first cutting edge 11a are basically discharged toward the rear end portion 10b (toward the holder 20) through the first flute 12a being continuous with the first cutting edge 11a, and chips generated by the second cutting edge 11b are basically discharged toward the rear end portion 10b (toward the holder 20) through the second flute 12b being continuous with the second cutting edge 11b.

Chips generated by the first chisel edge 11a1 being continuous with the first cutting edge 11a and chips generated by the second chisel edge 11b1 being continuous with the second cutting edge 11b go through the second flank surface 13b of the two flank surfaces (first flank surface 13a and second flank surface 13b), which are located correspondingly to the chisel edges 11a1 and 11b1, to the first flute 12a and the second flute 12b, and the chips are then discharged toward the rear end portion 10b. These flank surfaces have a role in reducing cutting resistance by avoiding contact with the workpiece.

The two side surfaces (first side surface 14a and second side surface 14b) are to be brought into contact with contact surfaces of the holder described later upon attachment to the holder. Specifically, the first side surface 14a and the second side surface 14b respectively lie continuously with the first flute 12a and the second flute 12b on the front side in the rotation direction. The first side surface 14a and the second side surface 14b extend toward the front side in the rotation direction.

In the present embodiment, the first side surface 14a and the second side surface 14b are asymmetric with respect to the central axis O in a front end view as shown in FIG. 5. Thus, the first side surface 14a and the second side surface 14b in the cutting tip 10, which are subjected to relatively less influence of cutting force, are asymmetric with respect to the central axis O in the front end view. Therefore, when attaching the cutting chip 10 to the holder, a smooth attachment operation is ensured without making a mistake in attachment direction.

The first side surface 14a and the second side surface 14b extend toward the front side in the rotation direction and hence are subjected to relatively less influence of cutting force, thereby making it possible to also have the effect of suppressing deterioration in cutting efficiency of the drill which can occur due to the asymmetric configuration.

Specifically, the first side surface 14a has an outwardly protruding circular arc shape in the front end view as shown in FIG. 5. Here, the circular arc of the first side surface 14a extends so as to form a concentric circle together with a circumscribed circle 10P of the cutting tip 10. This ensures that the first contact surface of the holder produces excellent strength against the cutting force in the rotation direction to be applied through the cutting tip 10 during the cutting process.

In contrast, the second side surface 14b has a straight line shape in the front end view as shown in FIG. 5. Although the straight line shape that is simple and easy to manufacture, this shape is apparently different from the circular arc shape of the first side surface 14a. Therefore, when attaching the cutting chip 10 to the holder, a smooth attachment operation is ensured without making a mistake in attachment direction.

On that occasion, the second side surface 14b having the straight line shape is located closer to the central axis O than the first side surface 14a having the circular arc shape in the front end view as shown in FIG. 5. The first side surface 14a having the circular arc shape imparts excellent strength to the holder against the cutting force in the rotation direction, whereas the second side surface 14b has the straight line shape and hence the holder may be affected in terms of the cutting force in the rotation direction. However, when the second side surface 14b having the straight line shape is located near the central axis O so as to be closer to the central axis O than the first side surface 14a, it is possible to reduce the influence of the second side surface 14b on the holder in terms of the cutting force in the rotation direction.

Alternatively, opposite ends of the first side surface 14a and opposite ends of the second side surface 14b may be point symmetric with respect to the central axis O in the front end view. This ensures the improvement of straight advance stability during machining of the workpiece.

The first side surface 14a and the second side surface 14b are preferably parallel to the central axis O. Here, parallelism is to be determined by contrast with a cutting line obtained by cutting the side surface 14a in a direction along the central axis O.

The two constraining surfaces (first constraining surface 15a and second constraining surface 15b) are respectively in contact with hold surfaces 25a and 25b of the holder to be described later, and have a major role in cooperating with the hold surfaces 25a and 25b to receive the cutting force in the rotation direction generated during the cutting process. Specifically, as shown in FIG. 2, the first constraining surface 15a and the second constraining surface 15b respectively lie continuously with the first side surface 14a and the second side surface 14b on the front side in the rotation direction. The first constraining surface 15a and the second constraining surface 15b extend in a tilt direction with respect to the rotation direction.

Here, the tilt direction with respect to the rotation direction denotes not being a direction along the rotation direction. Specifically, this denotes that an angle formed by the first constraining surface 15a, the second constraining surface 15b, and the rotation direction has a non-zero degree in the front end view. In the present embodiment, the first constraining surface 15a and the second constraining surface 15b extend in a direction orthogonal to the rotation direction in the front end view. Therefore, an angle formed by the first constraining surface 15a, the second constraining surface 15b, and the rotation direction is 90 degrees. The case of being thus orthogonal is also included in the concept of the tilt direction with respect to the rotation direction.

In the present embodiment, the first constraining surface 15a and the second constraining surface 15b extend in the direction orthogonal to the rotation direction as shown in FIG. 5, and are point symmetric with respect to the central axis O in the front end view. This ensures that the cutting force in the rotation direction generated during the cutting process is received with excellent strength.

Alternatively, the first constraining surface 15a and the second constraining surface 15b may extend on the same straight line passing through the central axis O in the front end view. This ensures that the cutting force in the rotation direction generated during the cutting process is received from a more effective direction, thereby producing more excellent effect.

In the present embodiment, the first constraining surface 15a and the second constraining surface 15b also extend from the circumscribed circle 10P of the drill 10 toward the central axis O in the front end view. The first constraining surface 15a and the second constraining surface 15b preferably extend in a straight line shape. Furthermore, the first constraining surface 15a and the second constraining surface 15b are preferably flat surfaces.

The first side surface 14a and the second side surface 14b need not directly be continuous with the first constraining surface 15a and the second constraining surface 15b, respectively. In order to achieve smooth connections between the first side surface 14a and the first constraining surface 15a and between the second side surface 14b and the second constraining surface 15b, curved surface shaped connection surfaces (not shown) may be respectively interposed therebetween. When the connection surfaces are thus interposed, end portions of the first side surface 14a, the second side surface 14b, the first constraining surface 15a, and the second constraining surface 15b are respectively located on boundaries between these end portions and the connection surfaces.

A region of an outer periphery of the cutting tip 10, in which the flutes 12a and 12b are not formed, corresponds to lands (first land 16a and second land 16b) as shown in FIG. 2, and a drill diameter (outer diameter) is kept in such a size as that before the flutes 12a and 12b are formed. The first land 16a and the second land 16b are located above the circumscribed circle 10P of the cutting tip 10 and have a circular arc shape as shown in FIG. 5. The circumscribed circle 10P of the cutting tip 10 is indicated by a dotted line in FIG. 5.

As shown in FIG. 5, the cutting tip 10 may have clearances 16a1 and 16b1. The clearances 16a1 and 16b1 may be formed so as to extend from the front end portion 10a to a region close to the rear end portion 10b. This makes it possible to reduce contact between the drill and an inner wall of a drilled hole in the workpiece. This also contributes to improving chip discharge performance.

The cutting tip 10 has the bottom surface 17 close to the rear end portion 10b as shown in FIG. 6. In the present embodiment, the bottom surface 17 has a planar shape and is perpendicular to the central axis. This ensures that the bottom surface 17 cooperates with the mounting surface of the holder described later to receive a force exerted rearward in the direction of the central axis during the cutting.

When the first side surface 14a has the outwardly protruding circular arc shape in the front end view, a large area of the bottom surface 17 can be ensured without excessively increasing a distance from the central axis O of the first side surface 14a. This makes it possible to avoid an excessively small thickness from the first contact surface to the outer periphery in the holder, thereby stably receiving the force exerted rearward of the central axis O during the cutting.

The cutting tip 10 also has a shaft foot 18 projecting from a central region of the bottom surface 17 as shown in FIG.

6. This ensures improvement in easiness of attachment to the holder. In the present embodiment, the shaft foot 18 has a circular columnar shape whose axis is the central axis O as shown in FIG. 6. The shaft foot 18 has a notched portion 18a to be brought into contact with a fixing member described later.

As can be seen from FIGS. 4 to 6, in the front end view of the notched portion 18a of the shaft foot 18 and the first contact surface 24a of the holder 20, the notched portion 18a of the shaft foot 18 is located on a straight line extending from the central axis O to the first contact surface 24a of the holder 20. The notched portion 18a and the first contact surface 24a are thus disposed to allow the cutting tip 10 to have excellent weight balance with respect to the central axis O, thereby improving the straight advance stability during machining of the workpiece.

To be specific, in the cutting tip 1 of the present embodiment, the second side surface 14b is located closer to the central axis O than the first side surface 14a. Accordingly, a center of gravity in the front end view is located deviatedly from the central axis O toward the first side surface 14a. However, when the notched portion 18a of the shaft foot 18 and the first contact surface 24a shown in FIG. 2 are located on the same straight line passing through the central axis O in a front end perspective view, the center of gravity in the front end perspective view is to be deviated toward the second side surface 14b by an amount being notched by the notched portion 18a of the shaft foot 18. Thus, the deviation of the center of gravity can be counterbalanced to minimize the deviation in the center of gravity of the cutting tip 1 from the central axis O in the front end perspective view. This contributes to improving the straight advance stability during machining of the workpiece.

In the foregoing embodiment, as specific shapes of the first side surface 14a and the second side surface 14b, which are asymmetric with respect to the central axis O in the front end view as shown in FIG. 5, the first side surface 14a has the outwardly protruding circular arc shape and the second side surface 14b has the straight line shape. However, the specific shapes of the first side surface 14a and the second side surface 14b are not limited thereto.

Modifications 1 to 4 are described below. Although these modifications differ from the foregoing embodiment in the shape of at least one of the first side surface 14a and the second side surface 14b, components other than these two side surfaces are identical to those of the foregoing embodiment. Therefore, descriptions of the components other than the first side surface 14a and the second side surface 14b are omitted here.

Figure 7:
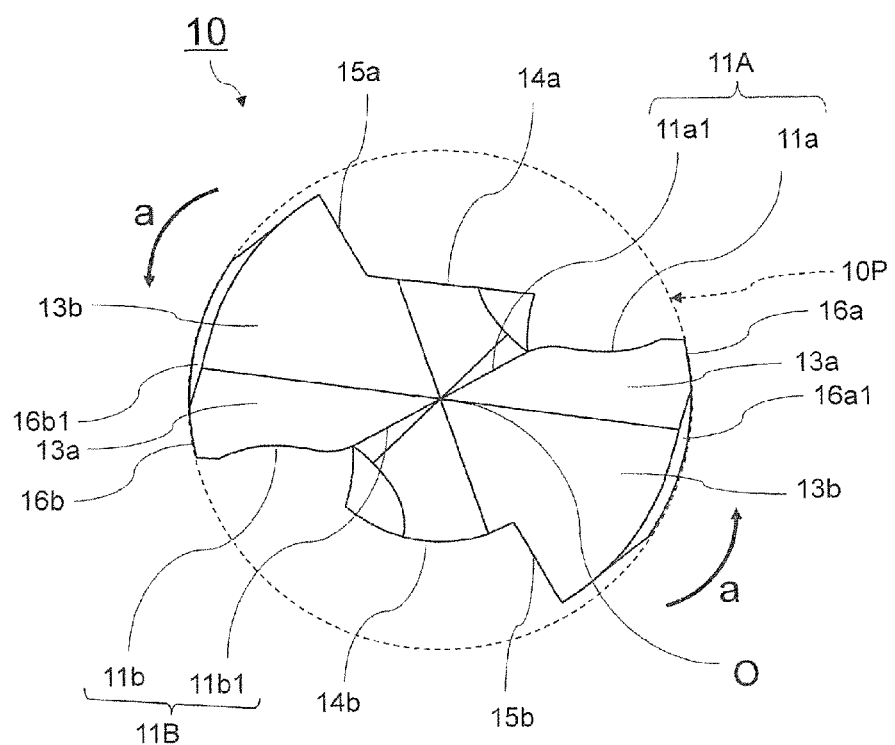
FIG. 7 is a front end view showing a modification 1 of the cutting tip shown in FIG. 5(a), which is viewed from a front end thereof.

As shown in FIG. 7, the first side surface 14a and the second side surface 14b may be made to be asymmetric with respect to the central axis O by such a configuration that the first side surface 14a is located closer to the central axis O than the second side surface 14b. In FIG. 7, the first side surface 14a has a straight line shape and the second side surface 14b has an outwardly protruding circular arc shape in a front end view.

Figure 8:
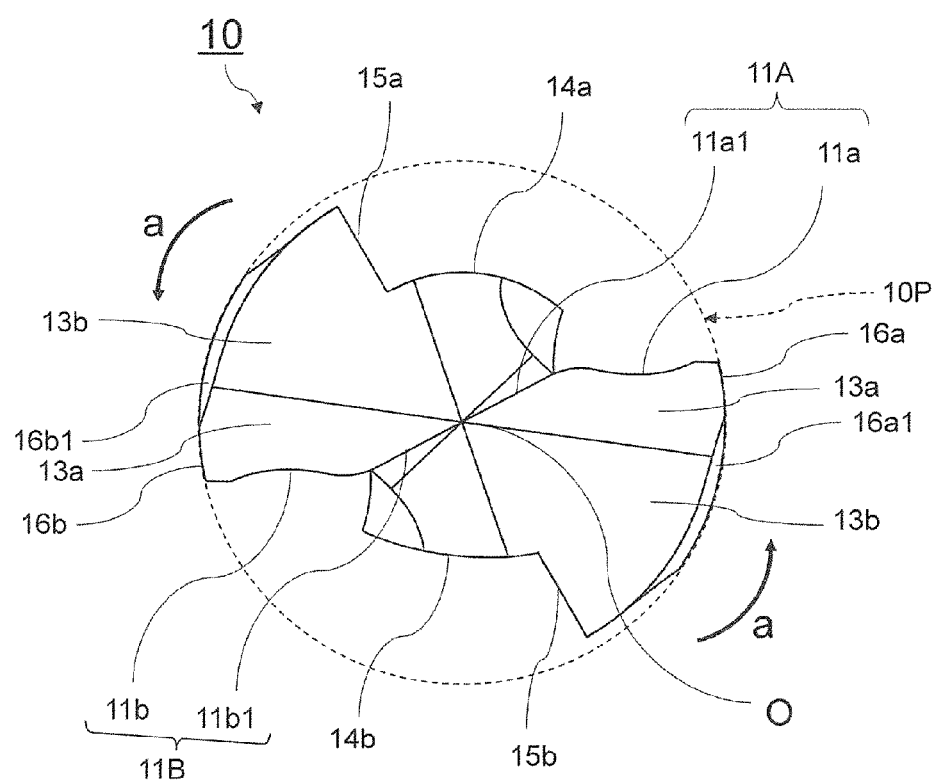
FIG. 8 is a front end view showing a modification 2 of the cutting tip shown in FIG. 5(a), which is viewed from a front end thereof.

As shown in FIG. 8, the first side surface 14a may have an outwardly protruding circular arc shape, and the second side surface 14b may have a curved line shape not being circular arc. In FIG. 8, the second side surface 14b is located closer to the central axis O than the first side surface 14a.

Figure 9:
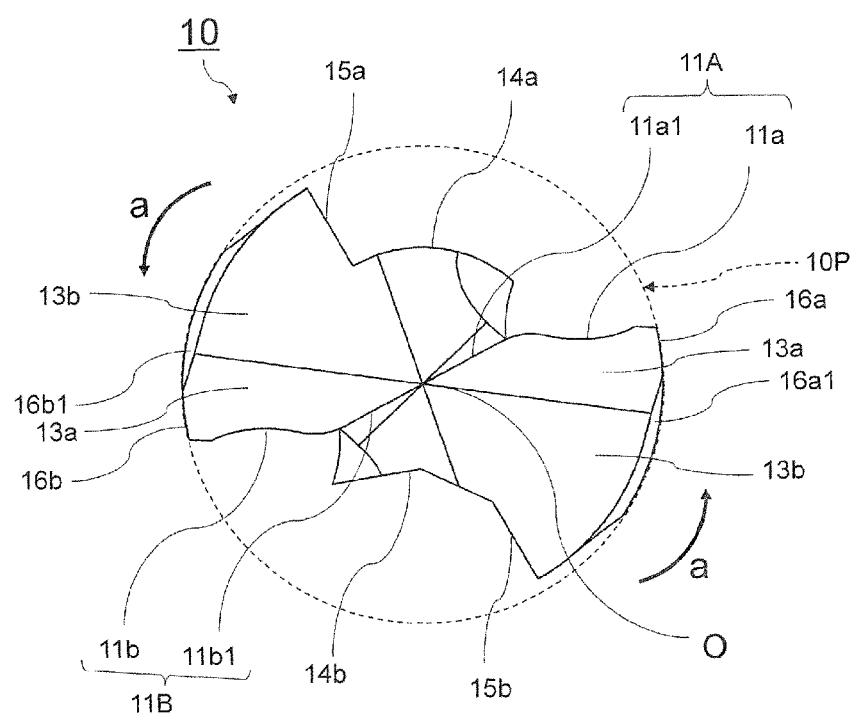
FIG. 9 is a front end view showing a modification 3 of the cutting tip shown in FIG. 5(a), which is viewed from a front end thereof.

As shown in FIG. 9, the first side surface 14a may have an outwardly protruding circular arc shape, and the second side surface 14b may be made up of a plurality of straight line shaped portions so as to have a generally concave shape.

Figure 10:
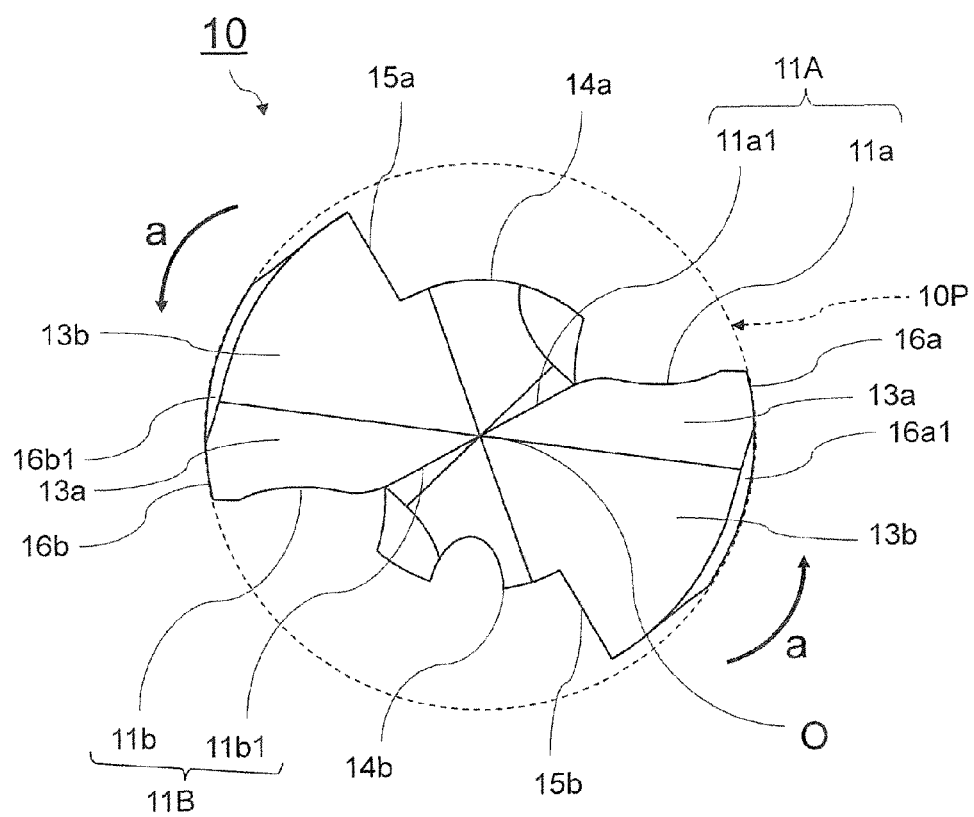
FIG. 10 is a front end view showing a modification 4 of the cutting tip shown in FIG. 5(a), which is viewed from a front end thereof.

As shown in FIG. 10, the first side surface 14a may have an outwardly protruding circular arc shape. Similarly to the first side surface 14a, most part of the second side surface 14b may have a circular arc shape, and the second side surface 14b may be partially provided with a concave shaped portion.

Also in these modifications, the first side surface 14a and the second side surface 14b are asymmetric with respect to the central axis O in the front end view, thereby producing an operation advantage similar to that of the foregoing embodiment.

(Holder)

The holder 20 is configured to attach the cutting tip 10 to the front end portion 20a thereof so as to cooperate with the cutting tip 10 to perform cutting of a workpiece.

Figure 12:
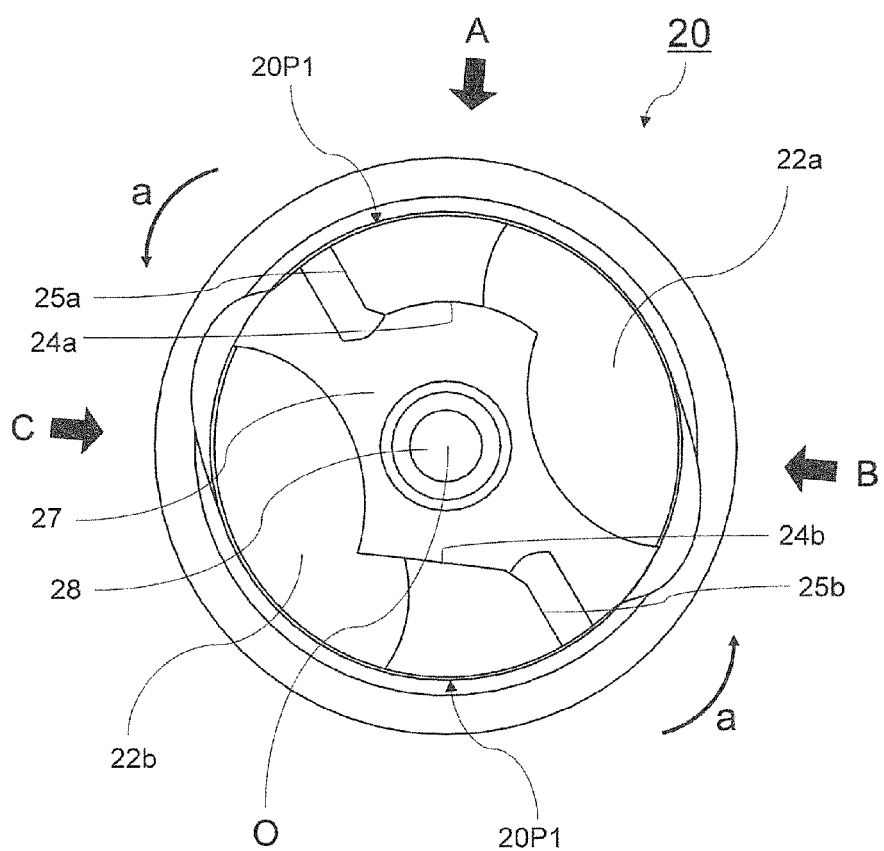
FIG. 12 is a front end view of the holder shown in FIG. 11, which is viewed from a front end thereof.

As shown in FIG. 1, the holder 20 of the present embodiment is located close to the rear end portion 10b of the cutting tip 10. As shown in FIG. 12, the holder 20 has a mounting surface 27, a first contact surface 24a, a second contact surface 24b, and a first hold surface 25a and a second hold surface 25b. The mounting surface 27 is to be brought into contact with the bottom surface 17 of the cutting tip 10 shown in FIG. 5. The first contact surface 24a and the second contact surface 24b are to be respectively brought into contact with the first side surface 14a and the second side surface 14b of the cutting tip 10 shown in FIG. 5. The first hold surface 25a and the second hold surface 25b are to be respectively brought into contact with the first constraining surface 15a and the second constraining surface 15b of the cutting tip 10 shown in FIG. 5.

Figure 11A:
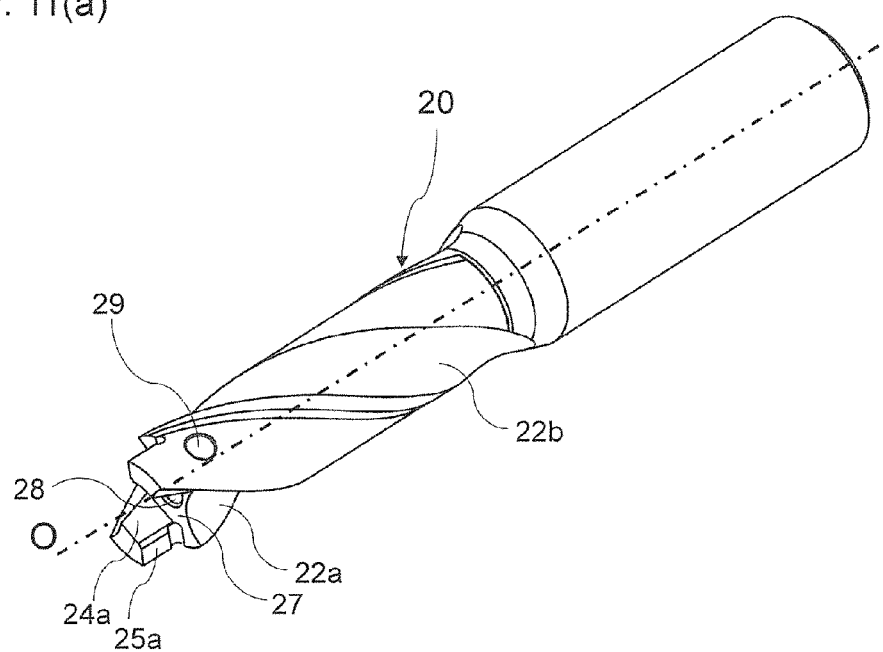
FIG. 11(a) is a perspective view showing a holder of the drill in FIG. 1.
Figure 11B:
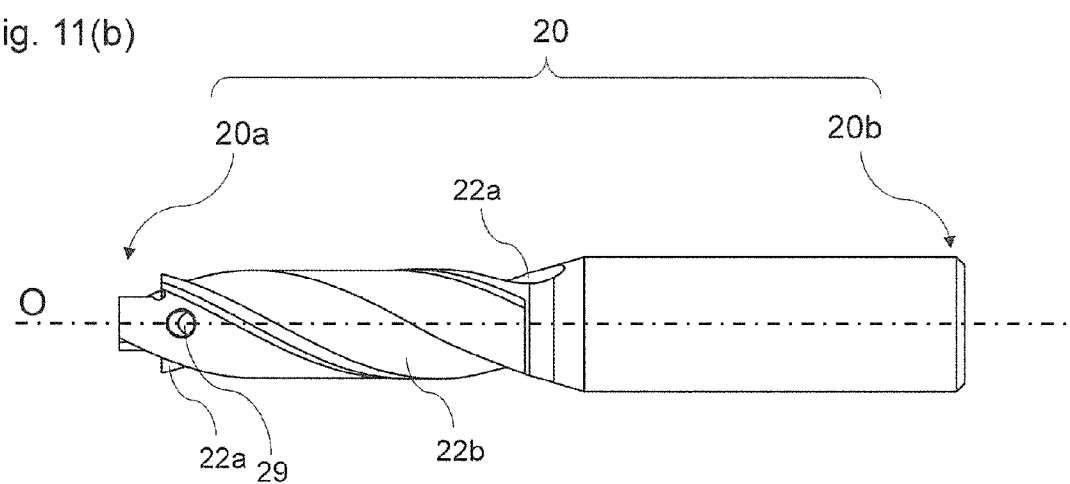
FIG. 11(b) is a side view thereof.

As shown in FIGS. 11 to 13, the holder 20 has a first major groove 22a and a second major groove 22b being respectively continuous with the first flue and the second flute of the cutting tip. The first major groove 22a and the second major groove 22b have a spiral shape. These components are described in sequence below.

The mounting surface 27 shown in FIG. 11 is to be brought into contact with the bottom surface 17 of the cutting tip 10 shown in FIG. 5 when mounting the cutting tip. The mounting surface 27 is located at the front end portion 20a of the holder 20. In the present embodiment, the mounting surface 27 has an approximately identical shape to the bottom surface 17 of the cutting tip 10.

A shaft receiving hole 28 is disposed on a middle region of the mounting surface 27. Similarly to the shaft foot 18 of the cutting tip 10 shown in FIG. 6, the shaft receiving hole 28 has a circular columnar shape whose axis is the central axis O in the present embodiment. The bottom surface 17 of the cutting tip 10 shown in FIG. 5 and the mounting surface 27 of the holder 20 shown in FIG. 12 are brought into contact with each other upon insertion of the shaft foot 18 of the cutting tip 10 into the shaft receiving hole 28. This ensures excellent strength against the force generated and applied in the direction of the central axis O during the cutting process.

Contact surfaces (first contact surface 24a and second contact surface 24b) shown in FIGS. 2 and 12 are to be respectively brought into contact with the first side surface 14a and the second contact surface 14b of the cutting tip 10 shown in FIGS. 4 to 10 when mounting the cutting tip 10. Similarly to the first side surface 14a and the second side surface 14b of the cutting tip 10, the first contact surface 24a and the second contact surface 24b are asymmetric with respect to the central axis O in the front end view.

The hold surfaces (first hold surface 25a and second hold surface 25b) are to be respectively brought into contact with the first constraining surface 15a and the second constraining surface 15b when mounting the cutting tip 10 shown in FIGS. 4 to 10.

In the present embodiment, the first hold surface 25a and the second hold surface 25b extend from an outer periphery 20P of the holder 20 toward the central axis O in the front end view as shown in FIG. 12. The first hold surface 25a and the second hold surface 25b preferably extend in a straight line shape.

As shown in FIG. 13, at least one of the first hold surface 25a and the second hold surface 25b is a flat surface.

The holder 20 further has a through hole 29. The through hole 29 penetrates between the outer periphery P2 and the shaft receiving hole 28. When attaching the cutting tip 10 to the holder 20, the through hole 29 permits insertion therein of the later-described fixing member with the shaft foot 18 of the cutting tip 10 inserted into the shaft receiving hole 28 of the holder 20.

Figure 3A:
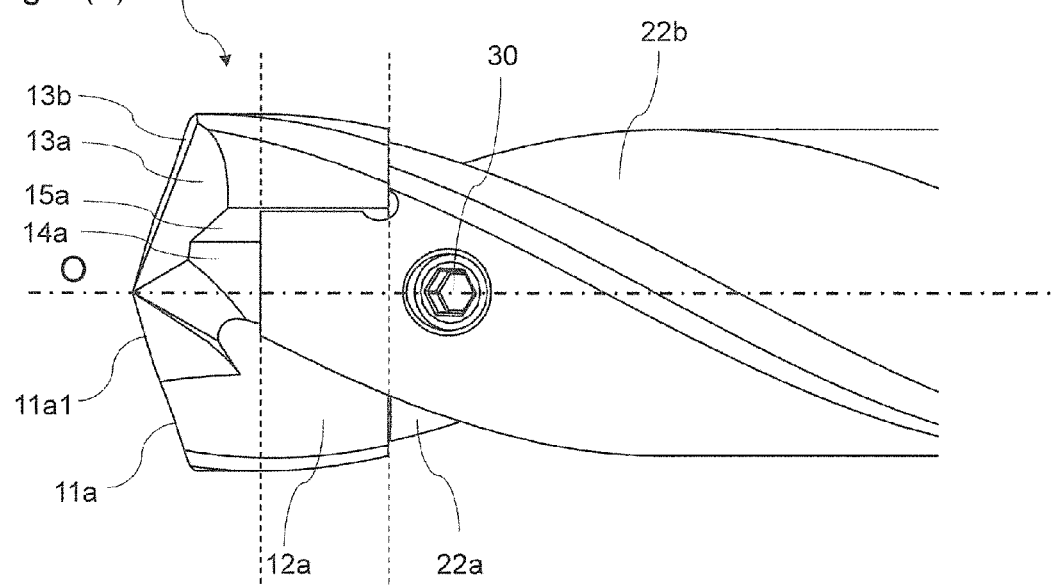
FIG. 3(a) is a side view of the drill shown in FIG. 2, which is viewed from an arrowed direction A.
Figure 3B:
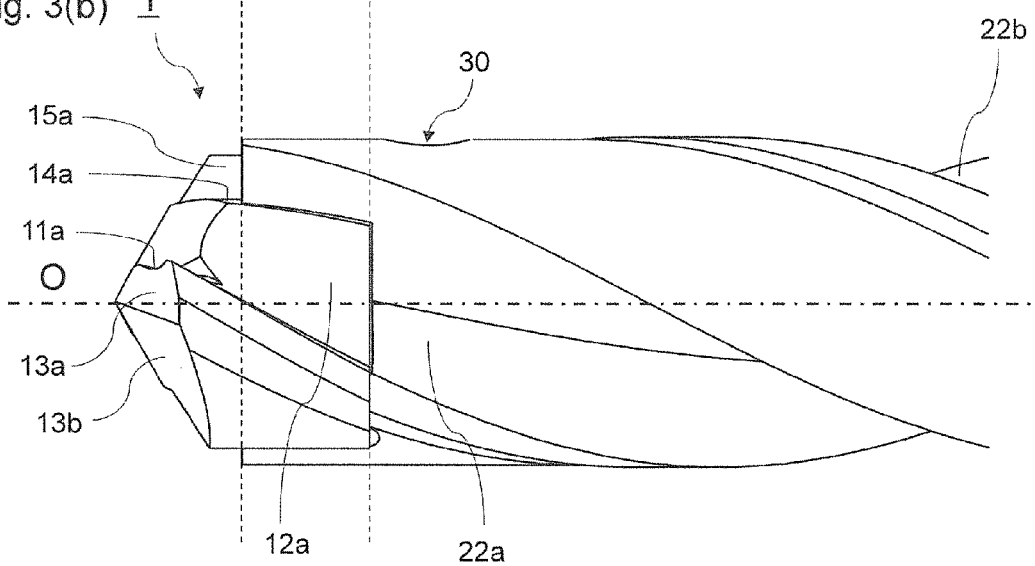
FIG. 3(b) is a side view of the drill, which is viewed from an arrowed direction B.

The cutting tip 10 and the holder 20 thus configured are to be fixed to each other by bringing the fixing member inserted from the through hole 29 into contact with or press against the notched portion 18a of the shaft foot 18, with the shaft foot 18 of the cutting tip 10 inserted into the shaft receiving hole 28 of the holder 20. For example, a screw may be used as the fixing member 30 as shown in FIGS. 1 and 3.

The drill 1 of the present embodiment is suitably usable as a drill with the cutting edges 11A and 11B having an outer diameter of 6 mm to 30 mm, preferably 8 mm to 25 mm. The drill 1 of the present embodiment is also suitably applicable to, for example, drilling of L/D of 5 or more in which L is an axial length (from the cutting edges 11A and 11B to terminals of the flutes 12a and 12b, respectively), and D is a diameter (an outer diameter of the cutting edges 11A and 11B).

<Method of Producing Machined Product>

An embodiment of a method of producing a machined product according to an embodiment of the present invention is described below with reference to FIG. 14. The present embodiment is described taking as an example the drill 1 according to the foregoing embodiment.

Figure 14A:
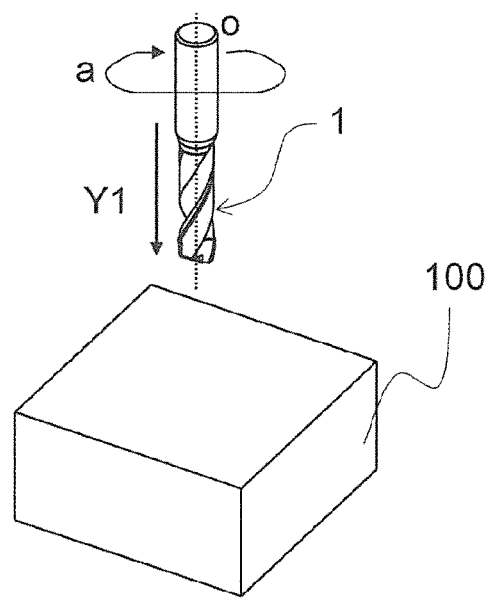
FIGS. 14(a) to 14(c) are schematic diagrams showing a method of producing a machined product according to an embodiment of the present invention.
Figure 14B:
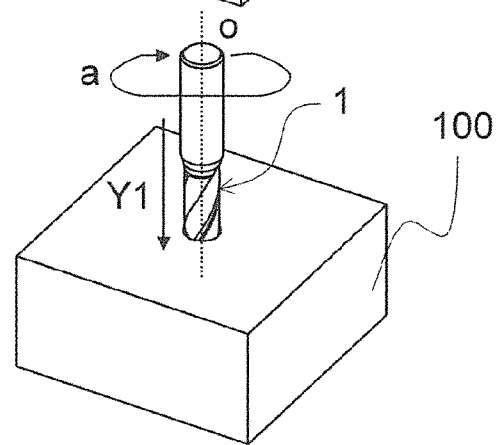
Figure 14C:
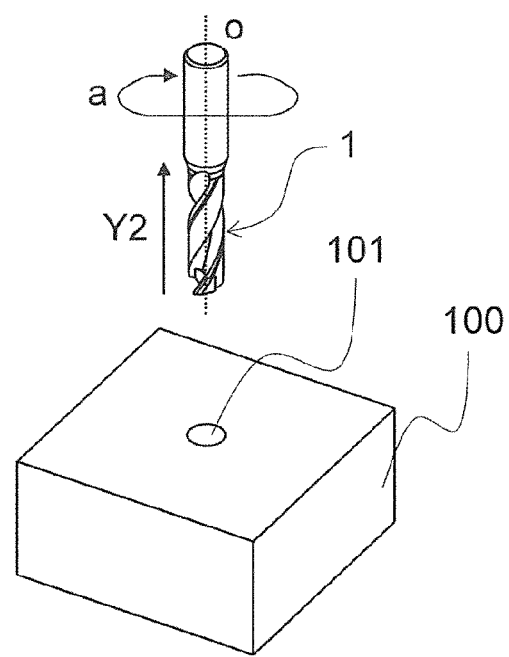

The method of producing a machined product according to the present embodiment has the following steps (i) to (iv):

(i) Disposing the drill 1 above a prepared workpiece 100 as shown in FIG. 14(a);

(ii) Bringing the drill 1 near the workpiece 100 by rotating the drill 1 in the arrowed direction "a" around the rotation axis O, and then moving the drill 1 in an arrowed direction Y1;

(iii) Forming a drilled hole 101, namely a through hole in the workpiece 100 by bringing the drill 1 nearer the workpiece 100 so that the first cutting edge and the second cutting edge of the drill 1 being rotated are brought into contact with a desired position of a surface of the workpiece 100 as shown in FIG. 14(b); and (iv) Separating the drill 1 from the workpiece 100 by moving the drill 1 in an arrowed direction Y2 as shown in FIG. 14(c).

The machined product shown in FIG. 14(c) is produced through the foregoing individual steps. The drill 1 is capable of producing excellent drilling performance.

The step (ii) may be carried out for example by fixing the workpiece 100 onto a table of a machine tool having the drill 1 attached thereto, and then bringing the drill 1 being rotated near the workpiece 100. In the step (ii), the workpiece 100 and the drill 1 may be brought near each other. For example, the workpiece 100 may be brought near the drill 1.

In the step (iii), from the viewpoint of obtaining a satisfactory machined surface, a setting is preferably made so that a partial region of the cutting tip of the drill 1 which is close to the rear end portion thereof does not penetrate the workpiece 100. That is, excellent chip discharge performance is producible by allowing the partial region to function as a margin region for discharging chips.

In the step (iv), similarly to the above step (ii), the workpiece 100 and the drill 1 may be separated from each other. For example, the workpiece 100 may be separated from the drill 1.

When the cutting process of the workpiece 100 as described above is carried out a plurality of times, for example, when a plurality of drilled holes 101 are formed in the single workpiece 100, it is required to repeat the step of bringing the first cutting edge and the second cutting edge of the drill 1 into contact with different locations of the workpiece 100 while keeping the drill 1 rotating.

While the several embodiments of the present invention have been described and illustrated above, the present invention is not limited to the foregoing embodiments. It is, of course, possible to make optional ones insofar as they do not depart from the gist of the present invention.

For example, the foregoing embodiment has been described taking the double-edged drill as an example, the foregoing configurations may be applied to a triple-edged drill. Specifically, in the double-edged drill, the first side surface and the second side surface are asymmetric with respect to the central axis in the front end view. In the triple-edged drill, any one of a first side surface, a second side surface, and a third side surface may not be rotational symmetric with respect to the central axis in the front end view.

Also in this configuration, the first side surface and the second side surface of the cutting tip which are subjected to relatively less influence of cutting force, are asymmetric with respect to the central axis in the front end view. Therefore, when attaching the cutting chip to the holder, a smooth attachment operation is ensured without making a mistake in attachment direction. The first side surface and the second side surface of the cutting tip are subjected to relatively less influence of cutting force and are therefore capable of also having the effect of suppressing deterioration in cutting efficiency due to the drill.

The shape of the cutting tip may be those normally employed by those skilled in the art without being limited to the configurations in the foregoing embodiments. For example, the cutting tip may have such a tapered shape that a core thickness, namely a diameter of an inscribed circle in a cross section perpendicular to the central axis increases from the front end portion toward the rear end portion.

Alternatively, the cutting tip may be tilted so that a drill diameter (outer diameter) increases or decreases from the front end portion toward the rear end portion. Furthermore, the cutting tip may have an undercut portion.

DESCRIPTION OF REFERENCE NUMERALS 1 drill
10 cutting tip
10a front end portion
10b rear end portion
10P circumscribed circle
11A, 11B cutting edge
11a first cutting edge
11b second cutting edge
11a1 first chisel edge 11a2 first thinning surface
11b1 second chisel edge
11b2 first thinning surface
12a first flute
12b second flute
13a first flank surface
13b second flank surface
14a first side surface
14b second side surface
15a first constraining surface
15b second constraining surface
16a first land
16a1 first clearance
16b second land
16b1 second clearance
17 bottom surface
18 shaft foot
18a notched portion
20 holder
20a front end portion
20b rear end portion
20P1 outer periphery
22a first major groove
22b second major groove
24a first contact surface
24b second contact surface
25a first hold surface
25b second hold surface
27 mounting surface
28 shaft receiving hole
29 through hole
30 fixing member
100 workpiece
101 drilled hole
O rotation axis, central axis

The invention claimed is:

1. A drill, comprising:
a cutting tip; and
a holder,
the cutting tip comprising
a first cutting edge and a second cutting edge located away from each other at a front end portion of the cutting tip,
a first flute and a second flute which are respectively continuous with the first cutting edge and the second cutting edge on a front side in a rotation direction, and extend toward a rear end portion side of the cutting tip,
a first side surface and a second side surface which are respectively continuous with the first flute and the second flute on the front side in the rotation direction, and extend toward the front side in the rotation direction,
a first constraining surface and a second constraining surface which are respectively continuous with the first side surface and the second side surface on the front side in the rotation direction, and extend in a tilt direction with respect to the rotation direction, and
a bottom surface located on the rear end portion, and
the holder being located on the rear end portion side of the cutting tip, the holder comprising
a mounting surface being in contact with the bottom surface,
a first contact surface and a second contact surface being respectively located so as to face the first side surface and the second side surface, and
a first hold surface and a second hold surface being respectively in contact with the first constraining surface and the second constraining surface,
wherein the first side surface and the second side surface are asymmetric with respect to a central axis, and the first constraining surface and the second constraining surface are point symmetric with respect to the central axis in a front end view
wherein the first side surface has a concave shaped portion.

2. The drill according to claim 1, wherein the first side surface has an outwardly protruding circular arc shape in a front end view.

3. The drill according to claim 2, wherein the second side surface has a straight line shape in a front end view.

4. The drill according to claim 3, wherein the second side surface is located closer to the central axis than the first side surface in a front end view.

5. The drill according to claim 1, wherein opposite ends of the first side surface and opposite ends of the second side surface are respectively point symmetric with respect to the central axis in a front end view.

6. The drill according to claim 1,
wherein the cutting tip further comprises a shaft foot projecting from a middle region of the bottom surface,
wherein the holder further comprises a shaft receiving hole which is located on a middle region of the mounting surface and permits insertion of the shaft foot into the shaft receiving hole, and a through hole penetrating between an outer periphery of the holder and the shaft receiving hole, and
wherein the drill further comprises a fixing member being inserted in the through hole and being in contact with the shaft foot.

7. The drill according to claim 6, wherein the shaft foot has a circular columnar shape whose axis is the central axis.

8. The drill according to claim 6, wherein the shaft foot comprises a notched portion to be brought into contact with the fixing member.

9. The drill according to claim 8, wherein the notched portion of the shaft foot and the first contact surface are located on an identical straight line passing through the central axis in a front end view.

10. The drill according to claim 6, wherein the through hole is located closer to the first side surface than the central axis in a front end view.

11. The drill according to claim 10, wherein at least one of the first hold surface and the second hold surface extends in a straight line shape from the outer periphery of the holder toward the central axis in a front end view.

12. The drill according to claim 1, wherein the first cutting edge and the second cutting edge are point symmetric with respect to the central axis in a front end view.

13. The drill according to claim 1, wherein the bottom surface has a planar shape.

14. The drill according to claim 1, wherein the bottom surface is perpendicular to the central axis.

15. A method of producing a machined product, comprising:
rotating a drill according to claim 1 around a rotation axis;
bringing the first cutting edge and the second cutting edge of the drill being rotated into contact with a workpiece; and
separating the drill from the workpiece.

* * * * *